US007165087B1

(12) United States Patent
Graupner et al.

(10) Patent No.: US 7,165,087 B1
(45) Date of Patent: *Jan. 16, 2007

(54) SYSTEM AND METHOD FOR INSTALLING AND CONFIGURING COMPUTING AGENTS

(75) Inventors: Sven Graupner, Mountain View, CA (US); Holger Trinks, Palo Alto, CA (US); Vadim Kotov, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 816 days.

This patent is subject to a terminal disclaimer.

(21) Appl. No.: 10/322,200

(22) Filed: Dec. 17, 2002

(51) Int. Cl.
*G06F 15/16* (2006.01)
*G06F 9/445* (2006.01)
(52) U.S. Cl. .................. 709/202; 717/174; 717/175
(58) Field of Classification Search ............ None
See application file for complete search history.

(56) References Cited

U.S. PATENT DOCUMENTS 6,138,153 A * 10/2000 Collins et al. ........... 709/221
6,381,742 B1 * 4/2002 Forbes et al. ............ 717/176
6,681,391 B1 * 1/2004 Marino et al. ........... 717/175
6,981,251 B1 * 12/2005 Kreller et al. ........... 717/171
2002/0087966 A1 * 7/2002 Wiginton et al. ........ 717/174
2004/0025157 A1 * 2/2004 Blight et al. ............ 717/174
2005/0165906 A1 * 7/2005 Deo et al. ............... 709/217

OTHER PUBLICATIONS

NA920382, "Remote Software Installation Protocol", vol. 34, issue 10A, p. 82-84, IBM Technical Disclosure Bulletin, Mar. 1992, US.*
Distributed Management Task Force, Inc., "Specficication for CIM Operations Over HTTP." Version 1.0, Aug. 11, 1999. (http://www.dmtf.org/download/spec/xmls/CIM_HTTP_Mapping10.php).

* cited by examiner

*Primary Examiner*—Wen-Tai Lin
(74) *Attorney, Agent, or Firm*—Richard P. Lange (57) ABSTRACT

A system and method for managing a plurality of agents in a plurality networked computing hosts. In various embodiments, a repository is provided with references to installation code for installing the agents. Boot stubs are executable on the hosts. The boot stubs retrieve references to the installation code and load the installation code on the hosts. A directory contains topology data that indicate the hosts on which boot stubs and agents are installed, and an initiator retrieves the topology data and initiate execution of the boot stubs.

19 Claims, 5 Drawing Sheets

```
<ENTRY1>
    <PATTERN XPATH = "/*/*/*/*/*/">
    <REF URL = //URL_ADDRESS/REGULAR.XML>
<ENTRY1>

<ENTRY2>
    <PATTERN XPATH = "/*/*/*/*/">
    <PATTERN XPATH = "/*/*/*/">
    <PATTERN XPATH = "/*/*/">
    <PATTERN XPATH = "/*/">
    <REF URL = //URL_ADDRESS/INITIATOR.XML>
<ENTRY2>
```

SYSTEM AND METHOD FOR INSTALLING AND CONFIGURING COMPUTING AGENTS

FIELD OF THE INVENTION

The present invention generally relates to deploying software in a networked computing environment, and more particularly to managing computing agents.

BACKGROUND

Currently, deploying software packages such as needed for management agents in computer systems is typically manual and difficult to automate. The management agents or other software entities are customarily identified by Internet Protocol (IP) addresses or host names and port numbers, which usually depend on the network infrastructure of machines that host the management agents or the software entities. Further, a node or an instance representing a management agent usually requires individual configuration information that is difficult to maintain when the number of instances significantly increases with larger networks.

Remote software installation and configuration systems have been available in which configuration engines provide centralized configuration information and interfaces for operators to perform remote configuration tasks, usually described in the form of scripts. However, configuration engines are also manual or operator-driven, i.e., the operators are required to initiate configurations. Configuration engines are not designed to install and establish whole topologies as controlled processes. A configuration engine initiates only one process, which does not initiate other processes for installing other instances, and does not facilitate automatic assignment of identity and roles to individual instances.

As the systems and their instances become larger, e.g., in the order of 5,000 to 10,000 instances, deployment tasks are becoming more complicated with issues of software distribution, installation, configuration, etc.

A system and method that address the aforementioned problems, as well as other related problems, are therefore desirable.

SUMMARY OF THE INVENTION

The invention provides a system and method for managing a plurality of agents in a plurality networked computing hosts. In various embodiments, a repository is provided with references to installation code for installing the agents. Boot stubs are executable on the hosts. The boot stubs retrieve references to the installation code and load the installation code on the hosts. A directory contains topology data that indicate the hosts on which boot stubs and agents are installed, and an initiator retrieves the topology data and initiate execution of the boot stubs.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In the following description, for the purposes of explanation, numerous specific details are set forth in order to provide a thorough understanding of the present invention. However, it will be apparent to those skilled in the art that the invention may be practiced without these specific details. In other instances, well-known structures and devices are shown in block diagram form in order to avoid obscuring the invention.

Figure 1:
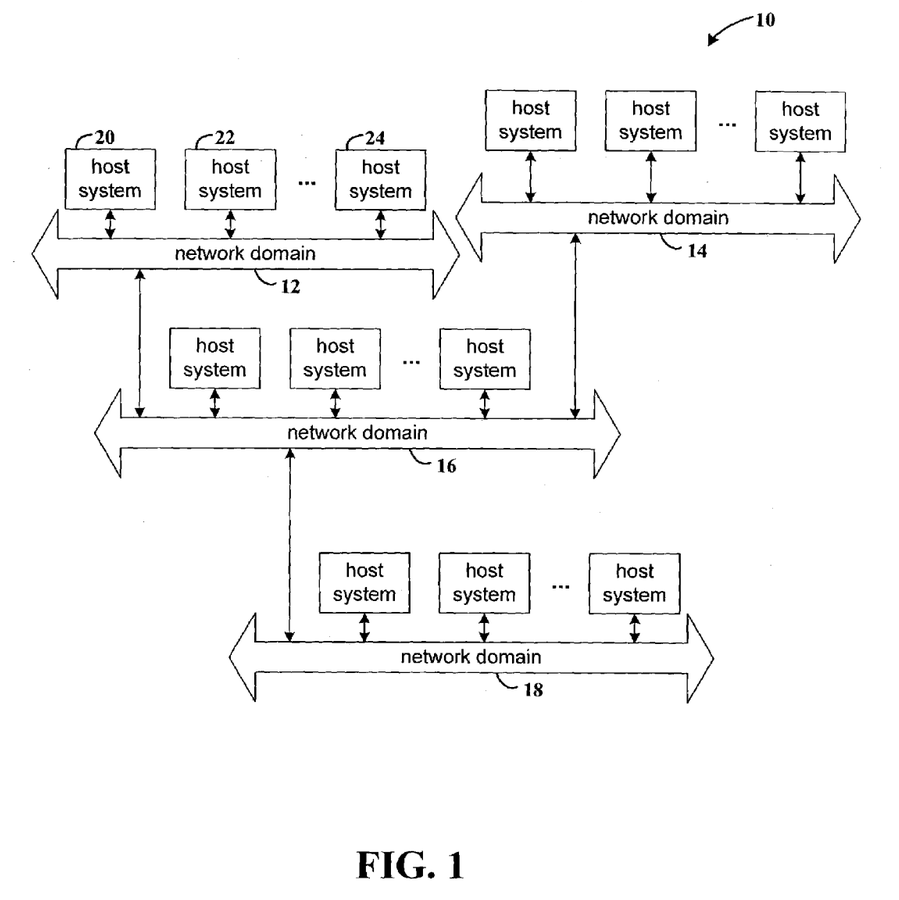
FIG. 1 is a functional block diagram that illustrates a networked arrangement of host computing systems on which software agents may be deployed.

FIG. 1 is a functional block diagram that illustrates a networked arrangement of host computing systems on which software agents may be deployed. Arrangement 10 includes multiple network domains 12, 14, 16, and 18, and each network domain links multiple host systems. For example, network domain 12 links host systems 20, 22, and 24 (and possibly more). Depending on the design requirements of arrangement 10, host systems in one network domain may communicate with host systems in another network domain via various conventional or application-specific hardware and software units (not shown) that link the network domains. The host systems may encompass all classes of computing arrangements, from personal computing devices to PCs to large-scale servers. Arrangement 10 may be a company intranet, for example.

In arrangements such as company intranets, management of the various systems relies on various management agents to gather, report, analyze, and/or respond to various information. The agents are deployed on as many of the host systems as needed to effectively perform the administrative task at hand. Thus, similar agents may be deployed in the same or in different domains, multiple agents may be deployed on a single host system, or different domains may have agents adapted to domain-particular requirements. It will be appreciated that while agents that provide services in support of system management functions are used herein as an example, other application-specific agents may be deployed using the teachings of the various embodiments of the present invention. The various embodiments of the invention are suitable for automating the deployment of large numbers of agents in a computing arrangement having a large number of host systems. Deployment of the agents is accomplished using various software and data components to control the process. The underlying software and data infrastructure includes initiators, directories, boot stubs, and repositories. Initiators control the deployment and (re-)configuration of agents. Initiators may be management applications or may be agents themselves assigned with roles of deploying and controlling other agents. Directories contain topology models defining where boot stubs and agents are physically installed. The boot stubs are protocol handlers on the host systems that are to host the agents. The boot stubs interact with the initiator, obtain the installation code and configuration data for the agents, and run the installation code on the hosts systems to install the agents. The repositories contain information about installation code and configuration data for agents, for example, the locations of the code and data. The various embodiments of the invention described herein may be used to establish a management overlay network that spans multiple management domains as well as multiple organizations such as enterprise management systems of multiple corporations.

Figure 2:
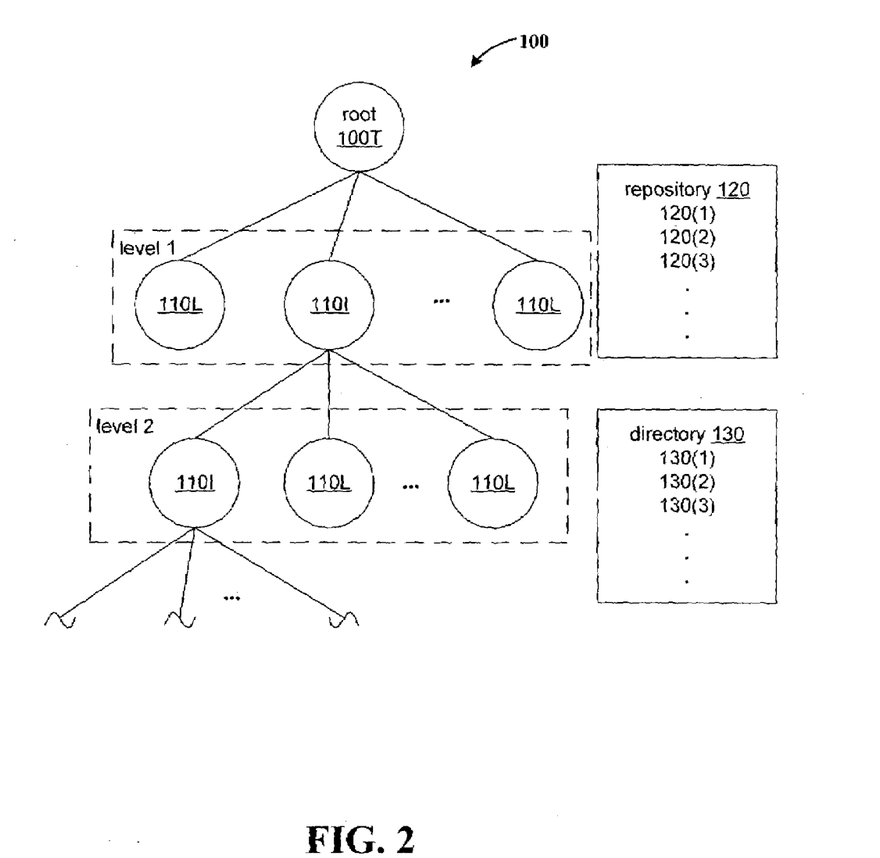
FIG. 2 illustrates an example agent topology as a hierarchy of nodes.

FIG. 2 illustrates an example agent topology as a hierarchy of nodes. The nodes represent agents, and the lines connecting the nodes represent the relationships between agents. Tree 100 includes a plurality of nodes and represents the logical relationship between management agents represented by nodes. A plurality of "child" nodes links to a "parent" node, and thus forms a level of the hierarchy. The link relationship replicates and results in hierarchical tree 100. Each agent represented by a node routes messages up and down the hierarchy of tree 100 and reports information collected from the host system(s) for which the agent is responsible to another agent in the tree. Example information includes status information such as whether a system is active or inactive, the system's workload, traffic, and exceptional stage.

A node represents an agent, such as a management server, a sensor, an actuator, or their equivalences. An agent is comprised of software components, and may be referred to as a software package or a set of computer programs and data. For example, management agents are installed into a computer of a data center providing the infrastructure for managing and controlling both hardware and software running on the data center's computers, and perform tasks such as monitoring, processing and disseminating management and control data, making decisions, actuating them, etc. The deployment techniques described herein may be used to deploy these management agents. Once all software components are deployed for a particular management agent, the management agent performs its corresponding assigned tasks as a server, a sensor, or an actuator.

A management server may include and thus manage a plurality of sensors and/or actuators, which provide data streams and report data to the management server, for example. A sensor collects information such as CPU utilization, machine temperature, the amount of data processed in a time period, etc. An actuator performs tasks such as controlling the computer, initiating reboot and shutdown, and executing database commands. Typically, an actuator waits for an external command for the actuator before initiating an action. A sensor may be self-initiating, usually in a time interval or on the occurrence of events such as when sensor thresholds are passed. A sensor also may also be queried for data.

Deploying agents is automated through a recursive process, including distributing, installing, and configuring software for each of the software packages of an agent on a host system. The host system, after the deployment process, may host more than one agent. A node may be an initiator node 110I or a leaf node 110L. Similarly, due to the nature of the recursive process, a child node of a node may also be an initiator node 110I or a leaf node 110L. An initiator node 110I, having at least one child node, controls the deployment and configuration of its child nodes. A leaf node 110L, having no child node, stops the recursive process, while an initiator node 110I, having at least one child node, continues to deploy its child nodes, and thus continues the recursive deployment process. When all child nodes are leaf nodes, the recursive process stops.

An initiator node 110I obtains information from a corresponding repository 120. Repository 120 provides information related to the child nodes, for example, whether a child node is an initiator node 110I or a leaf node 110L. A child node as an initiator node 110I, performs the tasks of initiator nodes, i.e., continuing to deploy its child nodes independently and in parallel to other initiator child nodes until the recursive deployment process stops. Typically, a system administrator determines the shape of tree 100, e.g., the number of nodes, the number of levels in tree 100, and the types of agents at each level, by providing appropriate information in repositories 120 controlling the recursive deployment processes.

Once initiator nodes 110I have performed their functions of deploying their child nodes as management agents, initiator nodes 110I may be removed from the system. In one embodiment, they remain in the system and are used to remove nodes 110 from tree 100. In this situation, nodes 110 are also recursively removed. Instructions to remove nodes propagate from the top node 110T to leaf nodes 110L each of which is inactivated and/or removed from the system. Once all child nodes of a node 110I are removed from the system, the node 110I is removed from the system. The process propagates up to top node 110T.

The nodes in tree 100 are connected via one or a plurality of communication links, which are mechanisms for nodes to communicate with one another. The communication link may be implemented using any one of a number of known network technologies, or even application-specific or newly developed network or communication technology.

Repositories 120 contain information about nodes, such as relationships among the nodes, references, identifiers or addresses of locations of installation programs or boot code, and configuration information. Repositories 120 also contain information that controls the deployment process of the nodes, along with information that specifies tasks for each node, such as whether a particular node is a server, a sensor, or an actuator. Generally, a system administrator determines the number of repositories 120, and provides configuration information to repositories 120 from which automated processes may start.

The number of repositories 120 in an application depends on factors such as the total number of nodes in tree 100, the types of agents represented by the nodes, and other application-specific factors. In an example embodiment, a repository 120 is associated with all nodes in a level in tree 100. That is, repository 120(1) is associated with all nodes 110 in level 1; repository 120(2) is associated with all nodes 110 in level 2; repository 120(3) is associated with all nodes 110 in level 3, etc. Repository 120(1) thus provides relevant information for level-1 nodes; repository 120(2) provides information for level-2 nodes; repository 120(3) provides information for level-3 nodes, etc. In another embodiment, an initiator node 110I collects configuration information for its child nodes from a repository 120 designated for that particular node 110I.

The information maintained by a repository 120 includes references to bootable installation programs for the agents, references to configuration data for the installation code, and references to configuration data for the agents. Installation code is the program code that is executed to install an agent. An installation program performs actions such as creating directories, updating application configuration files, and downloading more program files or libraries for the agents. Installation code may be shared for agents having similar roles. For examples, servers share the same installation code, sensors share the same installation code, and actuators share the same installation code. The installation code may include all the software components required for agents. For example, an installation program for an initiator may include software components to form a program that provides functions of an initiator; an installation program for a sensor may include software components to form a program that provides functions of a sensor, and an installation program for an actuator may contain software components to form a program that provides functions of an actuator.

Installation configuration data for the installation code include parameters and actions needed to install the agent. The installation configuration data together with installation code may be used to provide platform or role-specific differences of agents. Configuration data may be used, for example, to set or test specific environment variables and create directories, for the software components of the agent.

Runtime configuration data for agents include parameters specific for a particular instance of an agent. The data include, for example, environment settings, paths, and command line arguments for an agent. Example uses for the runtime configuration data include, for example, providing references to managed objects, references to other management agents, and interval times for status reports. In one embodiment, runtime configuration data for a management agent are passed to the management agent when it is launched.

Actual components of installation code and configuration data may be stored in repositories 120, but may also be stored in other forms or other locations. For example, installation code may be stored at a web site of a company that provides management software, while configuration data may be stored on the web site of another company that provides management services for customer environments. Alternatively, installation code and configuration data may be stored in the same repository as addressed by an entry in the repository. The installation code may also obtain additional files and configuration data from other locations such as installation servers.

In one embodiment, references to installation code and configuration data needed for deploying agents are stored as three separate lists: a first list for the installation code, a second list for installation configuration data, and a third list for the runtime configuration data. Upon receiving a request that includes an agent identifier, a repository 120 matches the identifier against patterns of all entries in each list. The repository returns references to installation code and configuration data of entries with patterns that match the agent identifier. This provides a fine-grained mechanism for sharing individual configurations from each list independently. Agents may share code, but may not necessarily share installation or runtime configuration data, or vice versa.

The more information can be shared, the less entries in the three lists are needed and the more compact descriptions can be provided. In an application where nothing can be shared, each individual agent requires its own entry in each of the three lists. The number of list entries would be equivalent to the number of agents. The code in Example 1 below illustrates example information contained in a repository for referencing installation code, installation configuration data, and runtime configuration data.

```
<repository-information>
    <managent-code> <!-two patterns match two shared code references—>
      <entry>
        <pattern path="*/dc_paloalto/*"/>
        <pattern path="*/dc_berlin/*"/>
        <ref url="http://sos.hpl.hp.com/repository/dc_all.sh"/>
      </entry>
      . . .
</managent-code>
<install-config> <!-two patterns match two different config sets—>
      <entry>
        <pattern path="*/cluster*/*">
        <ref url="http://sos.hpl.hp.com/repository/cluster_all.xml">
      </entry>
      <entry>
        <pattern path="*/SAP/*">
        <ref url="http://config.sap.com/repository/proccfg.xml">
      </entry>
      . . .
</install-config>
<managent-config>
      <entry>
        <pattern path="*/customer_x/*"/>
        <ref url="http://sos.hpl.hp.com/repository/customer_x_all.xml">
      </entry>
      . . .
</managent-config>
</repository-information>
```

EXAMPLE 1

If the following path identifier is provided to the repository in reference to a particular agent:

/hp_mgmt_domain/dc_paloalto/cluster_21/customer_x the repository will returns the references, "*/dc_paloalto/*" (installation code), "*/cluster*/*" (installation configuration data), and "*/customer_x/*" (runtime configuration data).

A boot stub is a protocol handler that runs on a host system on which an agent is to be deployed. The boot stub is responsible for handling the deployment protocols of one or more agents on that system. The boot stub receives control commands and messages from an initiator node 110I, e.g., when initiator node 110I requests the deployment of a node. Example control commands are used for deploying, configuring, starting, activating, and inactivating an agent. An example control message sent to a boot stub that initiates the deployment of an agent is illustrated in Example 2 below.

```
<?xml version="1.0" encoding="UTF-8"?>
<header>
    <to addr="http://palmtree.hpl.hp.com:8080/cs/boot-stub"/>
    <from addr="http://sos.hpl.hp.com/ControlService"/>
    . . .
</header>
<?xml version="1.0" encoding="UTF-8"?>
<body>
    <cmd name="deploy">
      <repository uri="http://sos.hpl.hp.com:8080/cs/repository"/>
      <initiator uri="http://sos.hpl.hp.com/ControlService"/>
      <boot-file type="java" name="SimpleAgent.class"/>
    </cmd>
</body>
```

EXAMPLE 2

The boot stub receives information related to installation code for agents, installation configuration data, and configuration data for the management agents. In one embodiment, the information is in the form of references from which the boot stub obtains the actual data.

The boot stub also maintains or has access to information that describes how to configure, start, and shutdown an agent. In one embodiment, the boot stub, in determining how to start a management agent, recognizes the file format, for example, binary executable, Perl scripts, or Java programs. The boot stub also receives a string that represents the command line needed to start an agent.

In one embodiment, boot stubs are implemented as Java servlets. The boot stub uses HTTP to communicate with an initiator node using XML-based messages, and files are attached as binary MIME extensions to XML messages. When installation code is started, the boot stub provides the code with the appropriate environment and command line parameters. Boot stubs may be implemented in different ways, including, for example, daemon processes launched by inetd on Unix, etc. Normally, boot stubs are implemented in a manner that allows starting the installation code of different formats, for example, Java classes, scripts, or executable binaries. A boot stub may also be part of the boot image of the host system.

In one embodiment, on request of the initiator that deploys an agent, a boot stub may reconfigure the agent after it has been deployed. Further, the boot stub may modify configuration parameters of the agent and triggers the agent to restart with the new configuration data. In an alternative embodiment, the boot stub terminates the agent, obtains new configuration data and/or new installation code and reruns the agent installation code with new configuration data.

Directories 130 are network services that provide boot-stub topology models and agent topology models. Depending on implementation requirements, a directory 130 may be part of network information services (e.g., NIS), or part of a repository 120. An agent topology model provides information about the deployed agents in a domain, and a boot-stub topology model provides information about the location of boot stubs on host systems, the locations of the host systems that will host the agents, and the type of agents to be installed, for example, a server, an initiator, or a sensor, or an actuator. An initiator node uses a boot-stub topology model to identify and locate host systems for the various agents to be deployed.

Topology models can be obtained in several ways. A program represented by a agent initializes a directory 130 with identifiers of systems that host a boot stub. When a system boots and the boot stub on that system is initialized, the boot stub sends a registration message to a pre-configured directory service that is responsible for registering the agent. Alternatively, when a boot stub is initialized, it sends a broadcast message to find the directory service. Once the directory service has been identified, the boot stub registers with the service. In yet another embodiment, a directory service periodically broadcasts messages, and listening boot stubs reply to this broadcast with a registration message to the directory service.

An agent's identity or identifier is the information that uniquely identifies the agent when it communicates with other agents and/or entities. For example, agents use the identifier to communicate with repositories 120 and/or directories 130, for registering information about agents, and to look up information about other agents. In one embodiment, identities of agents are generated while tree 100 is being generated.

The identity of a child node is represented by a string that is a concatenation of the identity of the initiator node and a unique identifier for the node. Naming the agents in this manner permits the overlay of management agents to route messages independent from the variety of underlying physical networks. Examples of identifiers for nodes may include a number or a character or a sequence of characters. For illustration purposes, unique identifiers for nodes in level 1 may be named "region1," "region2," "region3," etc.; nodes in level 2 are named "zone1," "zone2," "zone3," etc.; nodes in level 3 are named "dc1," "dc2," "dc3," etc. For further illustration purposes, if the identity of the top node or node 110T is "top," then the child nodes of node 110T, or the nodes in level 1, are named "top/region1," "top/region2," "top/region3," etc. The child nodes of node "region1" are named "region1/zone1," "region1/zone2," "region1/zone3," etc. The child nodes of node "region1/zone3" are named "region1/zone3/dc1," "region1/zone3/dc2," "region/zone3/dc3," etc. The identity of a node 110 thus represents a path starting from the top level to the node. In the above example, a character "/" separates a level of tree 100, and is used in one embodiment. It will be appreciated, however, that other characters such as "\", "&", or others may be used.

Figure 3:
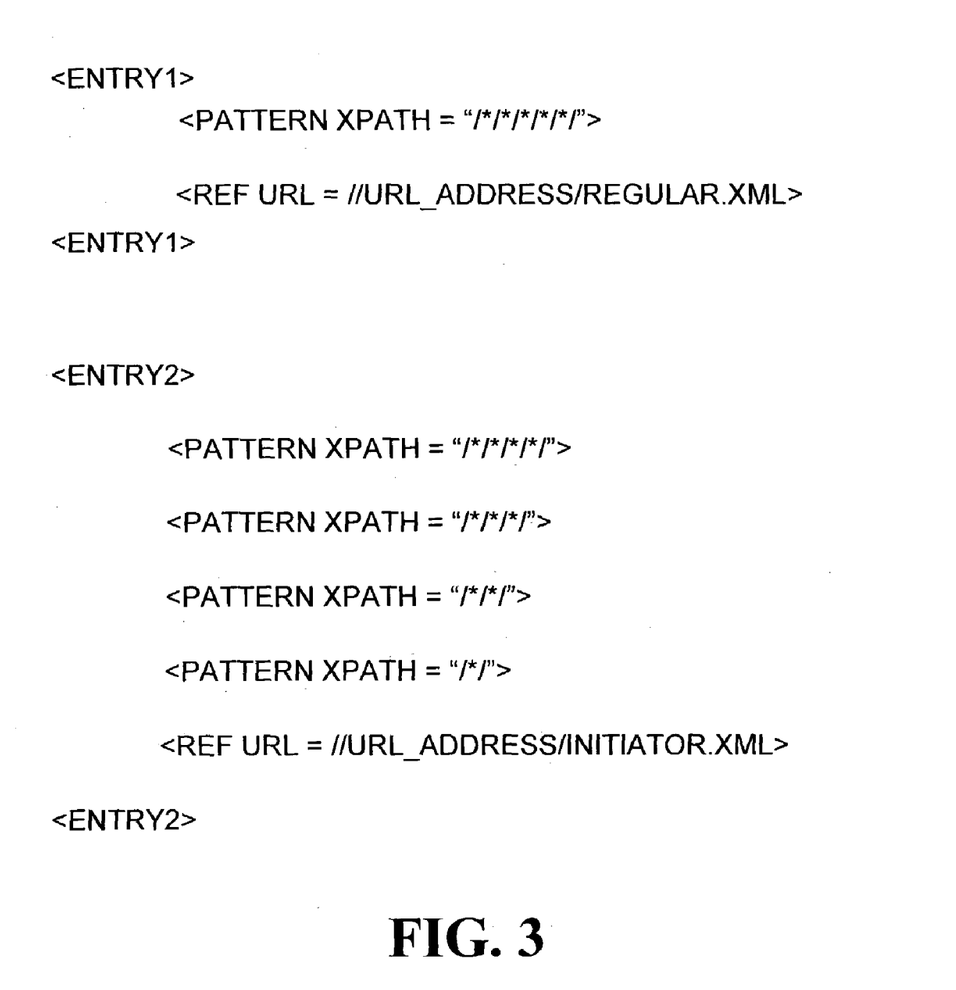
FIG. 3 shows an example of how configuration files, and thus node configurations are selected, in accordance with one embodiment.

FIG. 3 shows an example of how configuration files, and thus node configurations are selected, in accordance with one embodiment. Levels 1–4 include initiator nodes, and level five includes leaf nodes. Further, a "*" in between two "/" represents an entire level of a tree. Thus, the block, <ENTRY 1>, indicates that the file "regular.xml" is used to provide configuration data for all nodes in level 5, and block, <ENTRY 2>, indicates that the file "initiator.xml" is used to provide configuration data for all nodes in levels 1 through 4. Both files "regular.xml" and "initiator.xml" are referenced by an URL where //url_address is shorthand for the actual URL(s). In this example, if each initiator deploys 10 child nodes, then level 1 includes 10 nodes; level 2 includes 100 nodes; level three includes 1,000 nodes; level four includes 10,000 nodes; and level 5 includes 100,000 nodes.

Using patterns to implement references to configuration data allows use of the same configuration data from the same configuration files. As illustrated in the example of FIG. 3, only two configuration files "regular.xml" and "initiator.xml" are used for 100,000 nodes. Using patterns also controls the recursive process. For example, all nodes in the last level 5 of tree 100 use one configuration file "regular.xml" for configuring leaf-nodes, and, as the last level 5 includes all leaf nodes, the recursive process stops. Using patterns also avoids listing all names of nodes in repositories 120. As shown in FIG. 3, only a few statements are required to specify and determine the corresponding configuration file. Without the pattern matching technique, 100,000 names would have to be matched, which would burden system resources and require substantial management effort to maintain that data.

Figure 4:
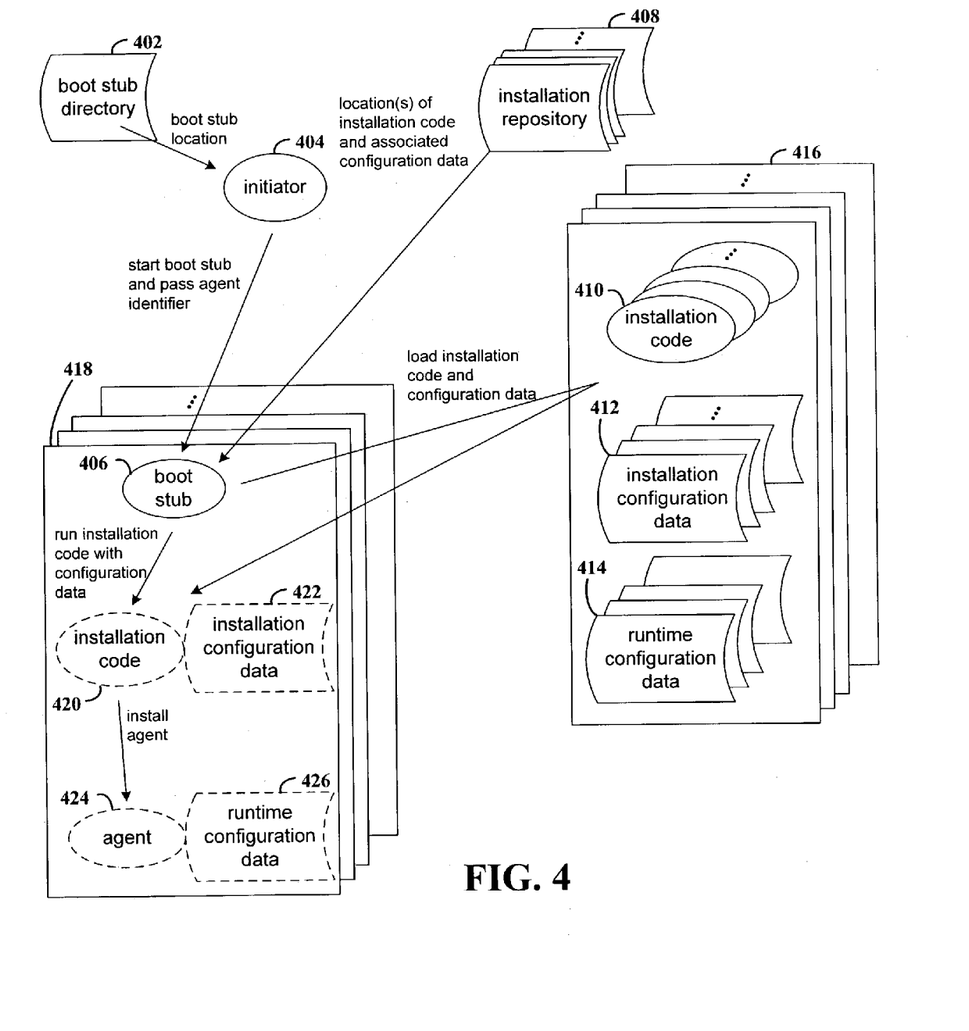
FIG. 4 is a block diagram that illustrates a general data and control flow between various components in deploying an agent.

FIG. 4 is a block diagram that illustrates a general data and control flow between various components in deploying an agent. Based on the information in boot stub directory 402, the initiator 404 sends a message to each boot stub 406 in its domain instructing the boot stub to initiate the deployment process. The request from the initiator includes data that identify the agent and a repository. The boot stub subsequently communicates with the repository in order to obtain references to the bootable code and configuration data based on the identity of the agent to be deployed. In one embodiment, multiple repositories 408 may be used for storage of references to installation code and configuration data.

The repository matches the agent identifier against patterns in three lists. The three lists contain references to agent code, references to installation configuration data, and references to runtime configuration data, respectively. Matching agent identifiers with patterns in the repository is based on regular expressions. References matching the agent's identifier are returned from the repository to the boot stub. The boot stub then obtains the actual data from these references.

The installation code 410 for the agent and associated configuration data 412, 414 are obtained from the referenced location. In one embodiment, the code and configuration data are distributed across multiple storage servers 416 according to application-specific requirements. In addition, the configuration data may include several descriptions (e.g. in the form of XML documents) from different locations. The installation code and installation configuration data as loaded on host system 418 are illustrated as elements 420 and 422, respectively.

Boot stub 406 runs the installation code 420 and provides installation configuration data 422 as input. When the installation code has completed execution, installation of the agent 424 is complete. The successful deployment of the agent is reported to the initiator 404.

The boot stub launches the agent and provides the runtime configuration data 426 as input. In one embodiment, the boot stub waits for the initiator to request that the agent be started. The initiator then updates directory 402 to reflect the new agent in the domain.

Installed agents are reconfigurable by two mechanisms that are controlled by the initiator. In the first type of reconfiguration, the boot stub modifies configuration parameters of an agent and requests that the agent restart with the new configuration settings. In the second type of reconfiguration, the boot stub terminates the agent, obtains new configuration data (and possibly new installation code) and re-runs the installation code with the new configuration data. Further details on the reconfiguration process are provided in the explanation of the various boot stub protocols described in association with FIG. 6.

Figure 5:
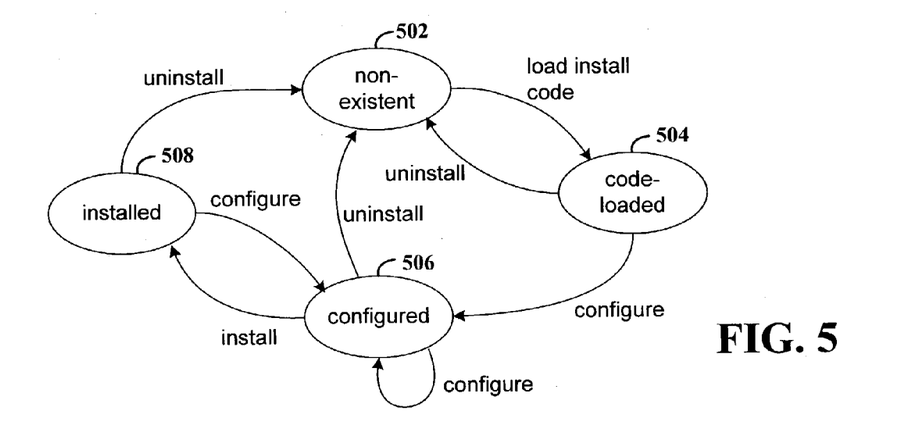
FIG. 5 is a state diagram that illustrates the states of an installation environment for installing an agent.

FIG. 5 is a state diagram that illustrates the states of an installation environment for installing an agent. The "installation environment" refers to the installation code, installation configuration data and actions that are necessary to deploy an agent. In general, the deployment process includes distribution of the code, configuration and installation. The states are described for the purpose of providing background information for explaining the protocols for installing, configuring, and reconfiguring the agent as described in FIG. 6 and Table 1 below. Some of the description below may repeat that already set forth above for FIG. 4.

The entry point of the discussion of the state diagram is the non-existent state 502. When the boot stub receives a deploy request, the boot stub loads the installation code and the installation environment transitions to the code-loaded state 504.

Recall from above that the repository provides references to the installation configuration data of the agent. The boot stub obtains the configuration data from the specified locations. Configuration data include, for example, environment variables and initialization parameters that are passed to the installation code. It is possible to reconfigure the agent after the installation process. To reconfigure, the boot stub requests new references for the configuration data from the repository, downloads the actual data and then needs to re-run the installation program with the new configuration. Once the configuration data have been loaded on the host system and deployed to the software system to be configured, the installation environment transitions to the configured state 506.

The boot stub runs the installation code with the configuration data to install the agent. The installation process may include typical actions such as creating directories, updating application configuration files, and downloading and/or running more program files or libraries. Running the installation code transitions the installation environment to installed state 508.

Once the installation code has been loaded, the configuration data have been loaded, and the agent has been installed, the installation code (or the agent code, depending on the state) can be uninstalled. Thus, from any of the code-loaded, configured, or installed states 504, 506, or 508, the installation environment may transition back to the non-existent state 502 by an uninstall process. The uninstall process removes all the installation code, agent code, and configuration data from the host system. The uninstall process also reverses the results of actions taken during the installation process.

Figure 6:
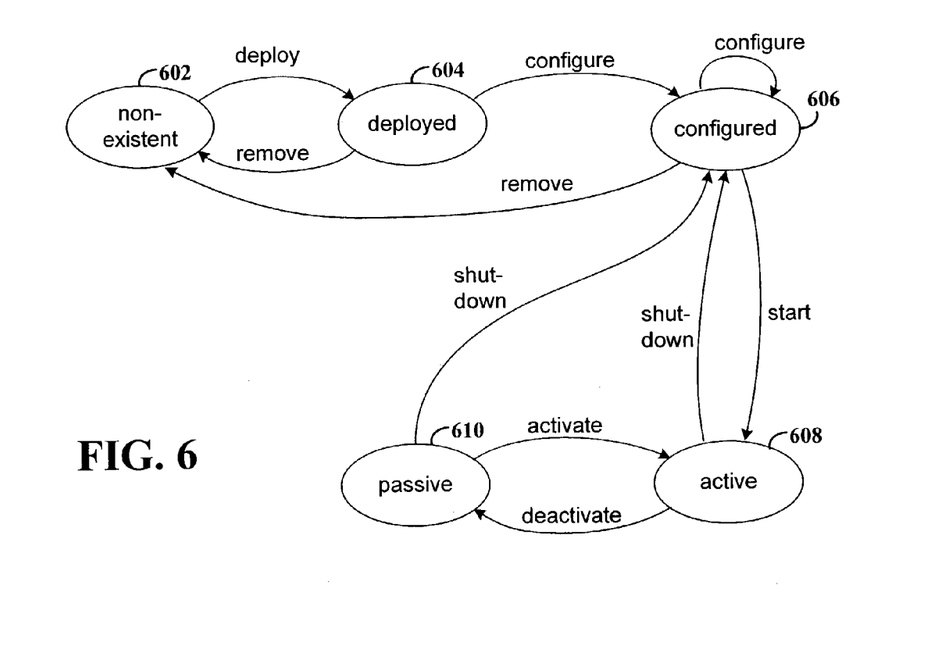
FIG. 6 is a state diagram that illustrates the states of an agent deployed in accordance with one embodiment of the invention.

FIG. 6 is a state diagram that illustrates the states of an agent deployed in accordance with one embodiment of the invention. The entry point of the discussion of the state diagram is the non-existent state 602. The agent remains in the non-existent state 602 as long as the installation environment is not yet in the installed state 508. The deploy transition is made to the deployed state 604 when the installation environment enters the installed state 508; the remove transition is made whenever the installation environment leaves the installed state.

Once the agent is in the deployed state, the agent can be configured and transition to configured state 606. Agent configuration includes the same actions as for the configuration in the installation environment. References to configuration data are obtained from the repository based on the agent's identity. The actual configuration data are then obtained from the specified locations. Agent configuration data may include parameters such as the port number on which the agent is to listen, identifiers and/or addresses of other agents in the control hierarchy, and interval times for reporting. The configuration data may be passed to the agent in form of environment variables or as command line arguments passed to the agent when the agent started. Reconfiguration of the agent may also be performed when needed.

Once the agent is in the configured state 606, the boot stub can start the agent, causing the agent to transition to active state 608. In one embodiment, the agent may be placed in either active state 608 or passive state 610. In the active state, the agent fulfills agent-specific tasks, such as receiving and sending messages from or to other agents, sensors, and management applications. The passive state is used to temporarily deactivate or suspend the agent without shutting it down.

State transitions for both, the installation environment and the agent itself, are caused by the execution of control commands received from the initiator. For example, from deployed state 604 or configured state 606, the agent will transition to the non-existent state 602 when the boot stub receives an uninstall command from an initiator. From the active and passive states 608 and 610, the agent transitions to the configured state 606 when a shut-down command is processed. An example embodiment in which a set of control commands is described in the following paragraphs.

The control commands are used to change the state of the installation environment or the agent itself. The control commands are categorized into those that affect the installation environment and those that affect the agent itself. However, there are some dependencies that affect both the installation environment and the agent. Table 1 describes the protocol messages for the external agent environment, and Table 2 describes the protocol and control commands for the agent.

TABLE 1

| Control Commands and input parameters | Installation Environment State Machine | Agent State Machine |
|---|---|---|
| Deploy repository-uri agent id uri: Universal Resource Identifier | condition: must be in state non-existent, transitions: load install code, configure, install, resulting state: installed | condition: must be in state non-existent, waits until external agent environment is in state installed, transitions: deploy, configure, start, resulting state: active |
| configure-env repository-uri agent id | condition: must be in state code loaded, configured or installed, transitions: configure, Resulting state: configured | condition: must be in state non-existent, |
| uninstall agent-id | condition: none, transitions: uninstall, resulting state: nonexistent | condition: must be in state non-existent, deployed or configured, transitions: remove, state: non-existing |

TABLE 2

| Control Commands and input parameters | Installation Environment State Machine | Agent State Machine |
|---|---|---|
| start agent-id | condition: must be in state installed | condition: must be in state configured, transitions: start, resulting state: active |
| shutdown agent-id | condition: must be in state installed | condition: must be in state active or passive, transitions: shutdown, resulting state: configured |
| restart agent-id | condition: must be in state installed | condition: must be in state active or passive, transitions: shutdown, start, resulting state: active |
| activate agent-id | condition: must be in state installed | condition: must be in passive state, transitions: activate, resulting state: active |
| deactivate agent-id | condition: must be in state installed | condition: must be in active state, transitions: deactivate, resulting state: passive |
| configure-agent repository-uri agent-id | condition: must be in state installed | condition: must be in state deployed or configured, transitions: configure, resulting state: configured |

The following paragraphs describe protocols for interfaces between the boot stub and the repository and between the boot stub and agent. The protocol between the boot stub and the repository includes the requests by the boot stub for references to agent installation code and/or configuration data. In one embodiment, four types of requests are supported:

1. request installation code reference;
2. request installation configuration data references;
3. request runtime configuration data references; and
4. request references to installation code, installation configuration data, and runtime configuration data for one agent.

An example of a request to the repository and the response generated by the repository is illustrated in Example 3 below.

Request:

<request>
  <type>install-configuaration</type>
  <id>/dc_paloalto/customer_x/cluster_12</id>
</request>

Response:

<reply>
  <type>install-configuaration</type>
  <id>/dc_paloalto/customer_x/cluster_12</id>
  <ref type="url">http://sos.hpl.hp.com/repository/customer_x/config.xml</ref>
  <ref type="url".>http://sos.hpl.hp.com/repository/dc-mgmt/paloalto.xml</ref>
  <ref type="url">http://sos.hpl.hp.com/repository/cluster-mgmt/basic.xml</ref>
</reply>

EXAMPLE 3

The protocol for interfacing between the boot stub and the agent supports the tasks of configuring, starting, and shutting-down the agent. Configuring the agent may be accomplished, for example, by passing environment variables and initialization (command line) parameters to the agent.

Various methods may be used to start an agent. For example, in one method the boot stub recognizes the file format (e.g. binary executable, perl script, java program). In another method, the installation program returns a string that represents the command line to issue to start the agent. In yet another method, the initiator provides the command to the boot stub.

The deactivate command may be used to shut-down an agent (Table 2). The deactivate command is sent from the initiator to a boot stub, and the boot stub responds by deactivating the specified agent. The activate and deactivate commands are passed through the boot stub. The boot stub supervises activities of an agent and has authority to activate and deactivate the agent.

In addition to starting and shutting down the agent, the interface between the boot stub and the agent allows the boot stub to place the agent in either an active state or a passive state. The activate command instructs the agent to start or continue work (active state). The deactivate command instructs the agent to cease doing work (passive state). The boot stub intercepts the agent's current work so that no data will be lost and work can be resumed after reactivation.

The present invention is believed to be applicable to a variety of software applications and has been found to be particularly applicable and beneficial in deploying management agent software applications. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for managing a plurality of agents in a plurality networked computing hosts, comprising:
    a repository of references to installation code for installing the agents;
    a plurality of boot stubs executable on the hosts, the boot stubs configured to retrieve references to the installation code and load the installation code on the hosts;
    wherein each boot stub retrieves a reference to particular installation code responsive to an input agent identifier associated with the particular installation code;
    a directory containing topology data that indicate the hosts on which boot stubs and agents are installed; and
    an initiator configured to retrieve the topology data and initiate execution of the boot stubs and input to each boot stub an agent identifier.

2. The system of claim 1, wherein the repository is configured with references to installation-configuration data, and the boot stubs are configured to retrieve the references to the installation-configuration data and input the installation-configuration data to the installation code.

3. The system of claim 2, wherein the repository is configured with references to agent-configuration data, and the boot stubs are configured to request from the repository the references to the agent-configuration data and input the agent-configuration data to the agents.

4. The system of claim 1, wherein the references to installation code in the repository are indexed by agent identifiers with values independent of a topology representative of the networked hosts.

5. The system of claim 1, wherein the repository is configured with references to installation-configuration data, and the references to data and installation code are indexed by agent identifiers.

6. The system of claim 5, wherein the boot stubs are configured to provide agent identifiers in requests to the repository for references to the installation code and installation-configuration data, obtain the installation-configuration data, initiate the installation code, and input the installation-configuration data to the installation code.

7. The system of claim 6, wherein the repository is configured with references to agent-configuration data, and the references to the agent-configuration data are indexed by agent identifiers.

8. The system of claim 7, wherein boot-agents are configured to obtain the agent-configuration data, initiate the agents, and input the agent-configuration data to the agents.

9. A method for managing an agent on a host system by a boot stub, the boot stub coupled to an initiator and a repository, comprising:
    transmitting a deploy command from an initiator to a boot stub, the deploy command including a repository identifier parameter and an agent identifier;
    transmitting a request from the boot stub to the repository in response to the deploy command, the request including the agent identifier;
    transmitting a first reference to installation code for the agent from the repository to the boot stub in response to the request;
    obtaining installation code for the agent by the boot stub from a source indicated by the first reference received from the repository, and loading installation code on the host system; and
    initiating execution of the installation code on the host system by the boot stub.

10. The method of claim 9, further comprising:
    transmitting a second reference to installation configuration parameters from the repository to the boot stub in response to the request;
    obtaining the installation configuration parameters by the boot stub from a source indicated by the second reference; and
    providing the installation configuration parameters as input to the installation code.

11. The method of claim 10, wherein the request from the boot stub to the repository further includes data that indicate the boot stub seeks the first reference to the installation code and the second reference to the installation configuration parameters.

12. The method of claim 11, further comprising initiating execution of the agent on the host system after installation.

13. The method of claim 12, further comprising:
    transmitting a third reference to activation parameters from the repository to the boot stub in response to the request;
    obtaining the activation parameters by the boot stub from a source indicated by the third reference; and
    providing the activation parameters as input to the agent.

14. The method of claim 13, further comprising:
    transmitting an uninstall command from the initiator to the boot stub, the uninstall command including an agent identifier;
    stopping execution of the agent referenced by the agent identifier; and
    removing agent program code from the host system.

15. The method of claim 13, further comprising:
    transmitting a shutdown command from the initiator to the boot stub, the shutdown command including an agent identifier; and
    stopping execution of the agent referenced by the agent identifier.

16. The method of claim 13, further comprising:
    transmitting a restart command from the initiator to the boot stub, the restart command including an agent identifier;
    stopping execution of the agent referenced by the agent identifier; and
    initiating execution of the agent.

17. The method of claim 13, further comprising:
    transmitting a deactivate command from the initiator to the boot stub, the deactivate command including an agent identifier; and
    suspending execution of the agent referenced by the agent identifier.

18. The method of claim 17, further comprising:
    transmitting an activate command from the initiator to the boot stub, the activate command including an agent identifier; and
    resuming execution of the agent referenced by the agent identifier if the agent is suspended.

19. An apparatus for managing an agent on a host system by a boot stub, the boot stub coupled to an initiator and a repository, comprising:

means for transmitting a deploy command from an initiator to a boot stub, the deploy command including a repository identifier parameter and an agent identifier;
means for transmitting a request from the boot stub to the repository in response to the deploy command, the request including the agent identifier;
means for transmitting a first reference to installation code for the agent from the repository to the boot stub in response to the request;
means for obtaining installation code for the agent by the boot stub from a source indicated by the first reference received from the repository, and loading installation code on the host system; and
means for initiating execution of the installation code on the host system by the boot stub.

* * * * *